UNITED STATES PATENT OFFICE.

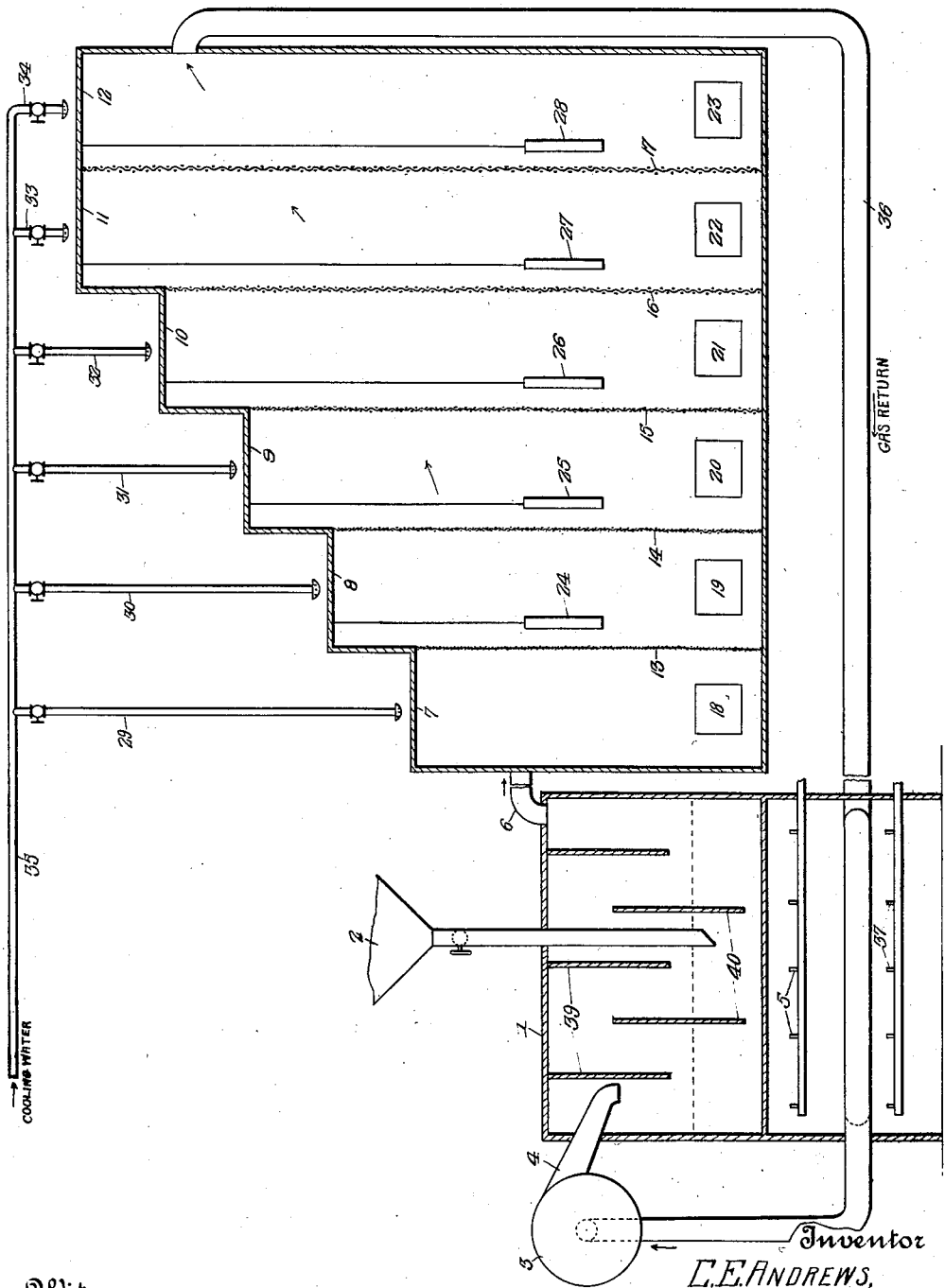

CHESTER E. ANDREWS, OF PITTSBURGH, PENNSYLVANIA, ASSIGNOR TO THE SELDEN COMPANY, OF PITTSBURGH, PENNSYLVANIA, A CORPORATION OF DELAWARE.

TREATMENT OF ANTHRACENE PRESS-CAKE.

1,324,717.     Specification of Letters Patent.     Patented Dec. 9, 1919.

Application filed July 1, 1918. Serial No. 242,903.

*To all whom it may concern:*

Be it known that I, CHESTER E. ANDREWS, a citizen of the United States, residing at Pittsburgh, in the county of Allegheny and State of Pennsylvania, have invented certain new and useful Improvements in the Treatment of Anthracene Press-Cake, of which the following is a specification.

The present invention constitutes an improvement in the treatment of anthracene press cake to produce the constituents thereof in a substantially pure state, by a method involving the conversion of the carbazol constituent thereof into sodium salt, and the fractional sublimation of the other constituents present. The crude anthracene press cake as ordinarily produced, usually contains, in addition to anthracene, about 60 to 70% of impurities. The principal of these impurities are phenanthrene, methyl anthracene and carbazol. The formulas and principal properties involved in the process are as follows:

Anthracene:

Melts 213° C.    Boils 351° C.

Phenanthrene:

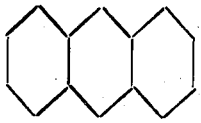

Melts 99° C.    Boils 340° C.

Methyl anthracene:

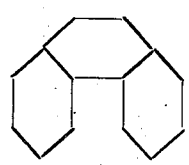

Melts 190° C.    Boils 360° C.

Carbazol:

Melts 238° C.    Boils 351° C.

In recovering substantially pure anthracene from this material, it is advisable to heat the material (the crude press cake in a suitable tank or vessel) with a solution of caustic alkali, for example caustic soda of 80 to 85% to a temperature of about 100° C. By this operation the carbazol is converted into its sodium salt, in accordance with the following reaction:

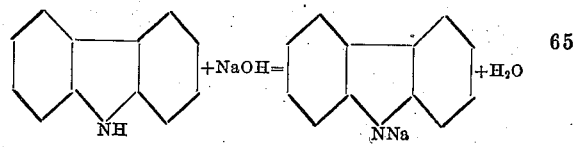

The sodium salt of carbazol, in accordance with the present invention, is preferably not separated from the mass at this stage, but the material, still containing this salt and other ingredients as above noted, is then heated in a current of air or inert gas, to a temperature of about 250° C. The air carrying vapors of anthracene, methyl anthracene and phenanthrene is then passed through a fractional condenser, in which the material which separates in the first compartment is largely anthracene, after which methyl anthracene separates, and finally phenanthrene separates. If a rather large number of compartments is made, and the cooling of the gases and vapors is conducted rather slowly, it is possible to produce a fairly sharp separation of the three materials. Any mixtures which are produced may be treated in any convenient manner to separate the constituents thereof.

After the anthracene, phenanthrene and methyl anthracene have all been driven off, the residue of the sodium salt of carbazol, remaining in the heated vessel, can be purified by well known means, such as solution in water, filtration, recrystallization if desired, and its solution can be acidified with $H_2SO_4$ or HCl, to reprecipitate the carbazol, in a relatively pure state.

In the operation of the process, the substance having the lowest boiling point will vaporize first from the mixture, whereas the substance having the highest boiling point will tend to remain in the mixture under treatment, particularly when the boiling points of the constituents of the mixture are rather far apart. The process may be operated by driving off from a mixture of two substances, the major part of the more volatile of such substances, while leaving in the mixture, the major part of the less volatile of such substances.

In the above examples, air is a suitable gas vehicle, in which to effect the sublimation of most of the substances mentioned under the temperature conditions specified. In other examples which might be given, air is not a suitable gas vehicle to employ, since many substances would undergo deleterious oxidation, if treated in a current of air, and for such materials I may employ other gas vehicles, such as purified chimney gas, $CO_2$, nitrogen, water gas, hydrogen, natural gas and various others, it of course being understood that the gas to be selected is one which will not injuriously affect the materials under treatment.

Without limiting myself to a specific arrangement of apparatus, I have illustrated in the accompanying drawing a longitudinal section of an apparatus which may conveniently be used in carrying out the process. In said apparatus the material to be separated is placed into a box-like vaporizer 1, provided with a filling funnel 2, or equivalent filling means, and a blast of gas suitable for use as a vehicle is introduced from the centrifugal pump 3 by pipe 4. The receptacle 1 may be heated in any convenient manner, for example by gas burners 5 placed below the same, and the current of gases and liquids produced in the vaporizer 1 may be carried through the pipe 6 into a suitable condensing chamber. This chamber contains a number of compartments of successively increasing height, illustrated from 7 to 12 respectively, and separated by screens of wire gauze 13 to 17, and the successive compartments are provided with a series of doors 18 to 23, inclusive, for removing the crystallized or sublimed matter collected in the several compartments. Elements 24 to 28, inclusive, are flat weights carried upon suitable rods, which weights may be swung out from time to time and allowed to bump against the screens, for the purpose of knocking off the accumulated sublimate. Cooling water may be supplied to the exterior of some one or more, or even all of these compartments by valved pipes 29 to 34, inclusive, fed from pipe 35, for the purpose of separately and independently cooling the several compartments of the condenser in a regulable manner.

The gases leaving the last condenser may be brought back through the pipe 36 to the pump 3, for reintroduction into the system, and if desired, a coil of pipe placed below the receptacle 1 may be heated by means of suitable gas burners 37, to approximately the same temperature as that at which the material in tank 1 is to be maintained. The tank 1 may be provided with downwardly extending baffles 39, and upwardly extending baffles 40, in order to make the gases follow a tortuous course.

The present application is in part a continuation of my prior application 219,447, filed February 27, 1918. In said application I have disclosed a considerable number of examples of mixtures of materials which can be separated into their component parts, by vaporization and fractional crystallization, using a current of inert gas, as herein set forth, and have made claims generic to such examples, such claims, of course, including the example given in the present case.

I claim,

1. A process of treating anthracene press-cake, which comprises heating the same with an alkali to convert the carbazol present into a salt, then heating further to a temperature sufficient to fractionally sublime anthracene and other materials, and collecting such sublimed materials.

2. In the fractionation of crude anthracene press-cake, the steps of treating with an alkali, and thereafter heating to about 200° C. in contact with a flowing gas current, whereby substances other than carbazol are vaporized, and carried along by said gas current, and thereafter gradually cooling said gas current whereby such vaporized substances are deposited in the solid state.

3. The improvement in the recovery of methyl anthracene, phenanthrene and anthracene, which comprises heating to about 200° C. in a flowing gas current, a mixture comprising such materials, and gradually cooling the said gas current.

In testimony whereof I affix my signature.

CHESTER E. ANDREWS.